Patented Apr. 30, 1946

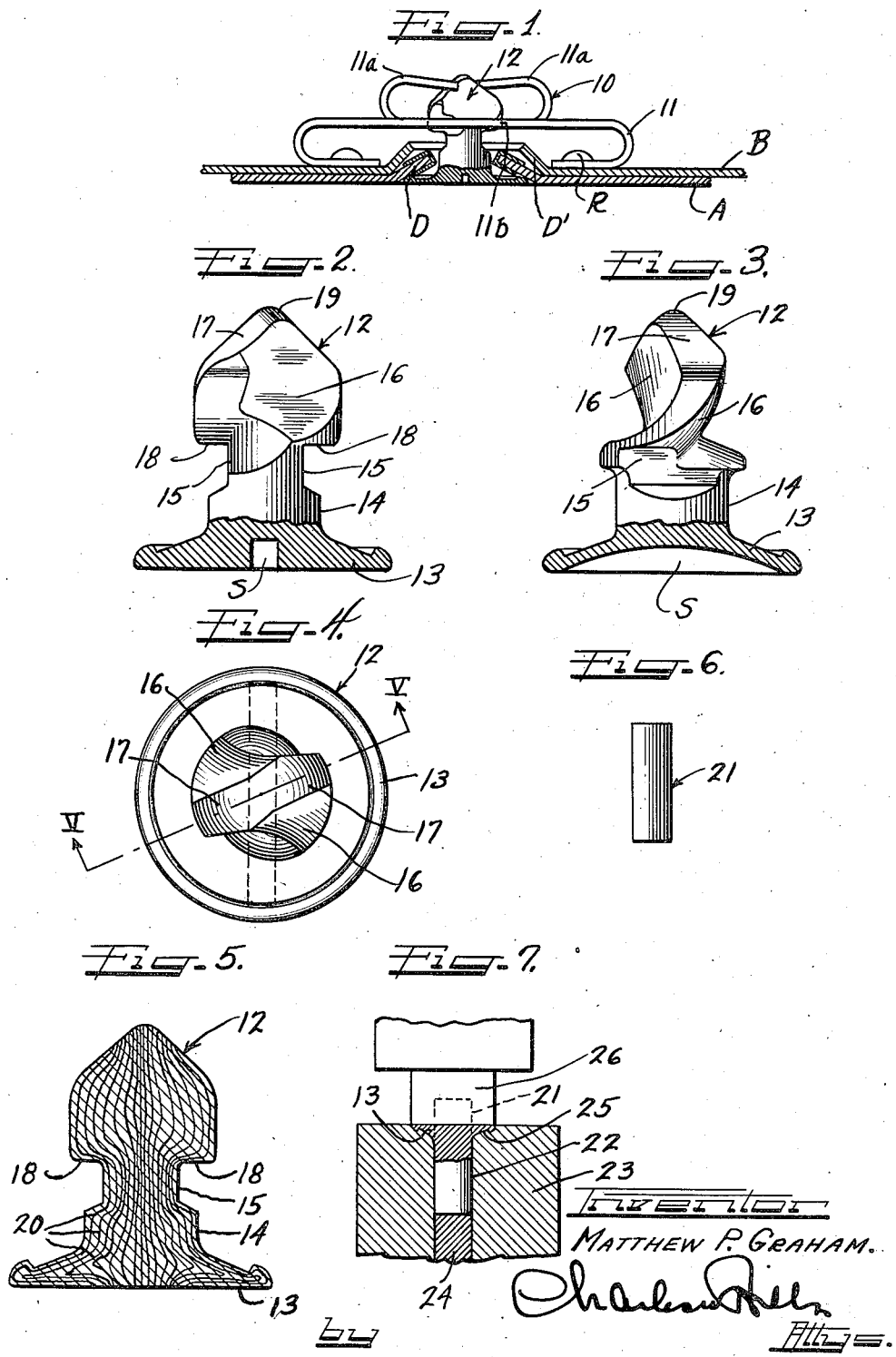

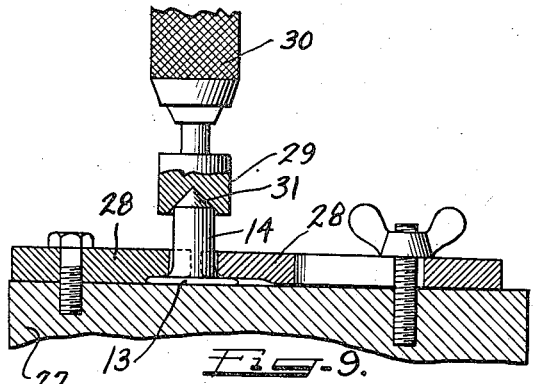
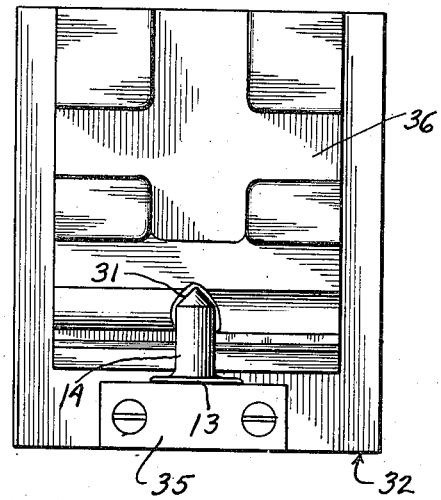
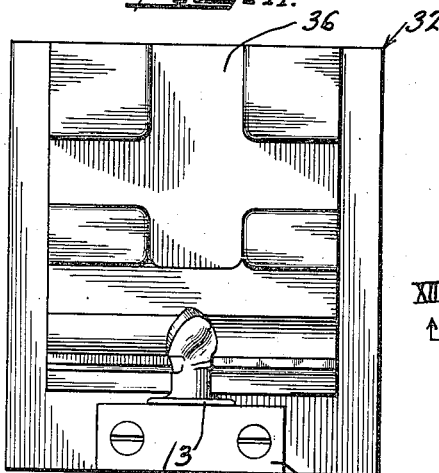
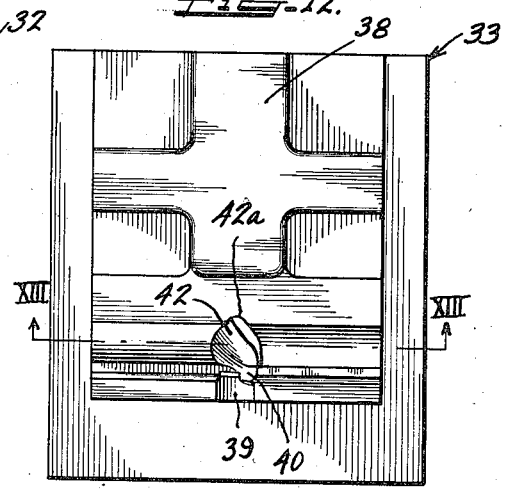
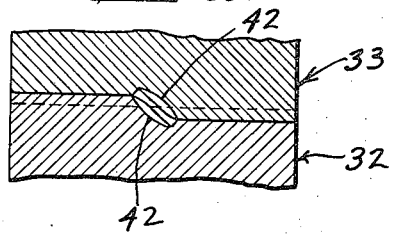
Inventor
MATTHEW P. GRAHAM.

2,399,181

UNITED STATES PATENT OFFICE 2,399,181

METHOD OF MAKING FASTENER STUDS

Matthew P. Graham, Detroit, Mich., assignor to Thompson Products, Inc., a corporation of Ohio Application March 13, 1943, Serial No. 479,069

5 Claims. (Cl. 10—27)

This invention relates to the production of fastener studs from metal rods.

Specifically, the invention relates to the making of studs for cowl fasteners by inexpensive upsetting and die pressing operations to produce articles which are stronger and have longer wear life than milled or lathe turned articles.

According to this invention, fastener studs useful in cowl fasteners more fully disclosed in the Anthony Venditty application entitled "Fastener," Serial No. 456,599, filed August 29, 1942, are made in a commercially economic manner involving pressing operations which preserve the longitudinal grain band formation of a rod type blank. The invention makes possible the production of better wearing and stronger studs than can be produced by lathe turning or milling operations, since wearing surfaces of the stud are defined by the sides of metal grain bands and not by cut or broken ends of metal grain bands.

In carrying out the process of this invention, a cylindrical metal rod is first upset on one end thereof to provide an enlarged head. In this upsetting operation the longitudinally extending grain bands of the rod are merely bowed outwardly. The other end of the headed rod is then pointed as by means of a rotary mill cutter. The ends of the metal grain bands may be exposed at this pointed end but since the pointed end is not subjected to appreciable wear, exposure of grain band ends at this portion of the stud is not objectionable.

The pointed and headed rod is then die pressed to flatten the pointed end and adjacent cylindrical portion of the rod into an enlarged wedge shaped head having quarter turn diverging helical side walls terminating at their root ends at inwardly extending shoulders. These shoulders are refined by the sides of metal grain bands and are much stronger than shoulders produced by cutting operations, since such cut shoulders would be defined by the ends of metal grain bands.

In the die pressing operation, a pair of mating dies are used each of which has a flattened recess of helical contour terminating in an inwardly projecting rib for forming simultaneously the enlarged flattened wedge shaped end and the shoulders on the pointed end of the rod.

It is then an object of this invention to provide a high capacity commercial method of producing fastener studs having complicated contours.

A still further object of this invention is to provide a method of forming studs for fasteners disclosed in the Venditty application, Serial No. 456,599, by upsetting and die pressing operations.

A still further object of the invention is to provide a cowl fastener stud having all surfaces thereof subjected to appreciable wear defined by the sides only of metal grain bands.

A still further object of the invention is to provide dies capable of acting on a cylindrical rod to form, in one operation, a wedge shaped extremity on the rod having quarter turn helical surfaces on opposite sides thereof terminating at inwardly extending shoulders.

A still further object of the invention is to provide a method of making complicated fastener studs from metal blanks without wasting metal.

A still further object of the invention is to produce cowl fastener studs from cylindrical rods without wasting metal.

Other and further objects of the invention will be apparent to those skilled in the art from the following detailed description of the annexed sheets of drawings which, by way of preferred example only, illustrate one embodiment of the invention.

On the drawings:

Figure 1 is a side elevational view of a cowl fastener including a stud of this invention and illustrating the manner in which the fastener and stud cooperate to lock together a pair of plates shown in vertical cross-section;

Figure 2 is an enlarged side elevational view with a portion broken away and shown in vertical cross-section, of a fastener stud according to this invention;

Figure 3 is a view similar to Figure 2 but taken at right angles to Figure 2;

Figure 4 is a top plan view of the fastener stud shown in Figures 1 to 3;

Figure 5 is a vertical cross-sectional view of the fastener stud taken along the line V—V of Figure 4, and illustrating the grain band formation of the stud;

Figure 6 is a side elevational view of a cylindrical metal rod from which the fastener stud of this invention is produced;

Figure 7 is a side elevational view, with parts in vertical cross-section, of upsetting dies illustrating the manner in which a head is formed on the rod of Figure 6;

Figure 8 is a side elevational view, with parts in vertical cross-section, illustrating a device for pointing the end of the headed rod;

Figure 9 is an end elevational view of a pair of dies for acting on the headed and pointed rod of Figure 8 to produce a stud fastener according to this invention;

Figure 10 is a view on a larger scale than Figure 9, illustrating one of the die members of this invention with a headed and pointed rod seated therein for the die pressing operation;

Figure 11 is a view similar to Figure 10 but illustrating a finished fastener stud seated in the die at the completion of the pressing operation;

Figure 12 is a view similar to Figures 10 and 11 of the mating die for the die shown in Figures 10 and 11; and Figure 13 is a vertical cross-sectional view taken through the pair of dies of Figure 9 along a line designated at XIII—XIII in Figure 12.

As shown on the drawings:

In Figure 1 the reference character 10 designates generally a cowl fastener such as is disclosed and claimed in the Anthony Venditty application Serial No. 456,599, filed August 29, 1942. The fastener includes a spring receptacle 11 mounted on an inner-apertured metal plate B by means of rivets R together with a fastener stud 12 according to this invention, rotatably mounted in the aperture of an outer plate A and extending into the receptacle 11 to be locked into a hole of the receptacle and held against unauthorized rotation by means of fingers 11a—11a of the receptacle. The receptacle 11 has a rectangular aperture 11b through which the studs can extend and the walls of the receptacle adjacent the long sides of the aperture are adapted to be gripped by shoulders of the stud which overlie these walls as more fully described in the Venditty application Serial No. 456,599.

As best shown in Figures 2 to 4 the fastener stud 12 of this invention has an enlarged circular head 13 at one end thereof equipped with a central screwdriver slot S formed by means of a circular mill cutter, a cylindrical shank portion 14 projecting from said head 13, diametrically opposed flat bottomed slots 15—15 in the cylindrical shank 14 and an enlarged wedge-like end portion with quarter turn helically shaped side walls 16—16 extending from sloping end surfaces 17—17 to terminate in undercut shoulders 18—18 on the upper ends of the slots 15—15. The end surfaces 17—17 merge together at an apex 19.

When the stud 12 is mounted for operation in a cowl fastener, the head 13 thereof is adapted to be seated in a dimple D of the outer plate A as shown in Figure 1, while the shank 14 is adapted to pass freely through the apertured bottom of this dimple. The shoulders 18 overlie the dimpled aperture to retain the stud in the outer plate A. The enlarged flattened end of the stud is insertable through an apertured dimple D' of the inner or top plate B into the rectangular aperture 11b of the receptacle 11. The receptacle is secured on the inner plate B by means of the rivets R around the dimple D'. Upon quarter turn rotation of the stud 12 in the receptacle 11 the fingers 11a—11a of the receptacle are spread apart along the diverging end surfaces 17—17 until the stud is rotated sufficiently so that the fingers will ride on the helical sides 16—16. These helical sides 16—16 are effective to engage the receptacle along the rectangular aperture 11b to draw the receptacle toward the plate B. Upon completion of quarter turn rotation of the stud the shoulders 18—18 of the stud will overlie the receptacle to hold the plates A and B in tight engagement.

In accordance with this invention, and as shown in Figure 5, the fastener 12 has all wearing surfaces thereof, such as the under surfaces of the head 13, the surfaces of the cylindrical shank 14, the surfaces of the shoulders 18—18, and the surfaces of the helical portions 16—16 defined by the sides only of metal grain bands 20. This construction materially increases the wear life of the stud because the grain bands are not cut through to expose their ends at any points of the stud subjected to stress and wear. The metal is worked during the forming operation, according to this invention, to bow various portions of metal grain bands, but these bands are not cut. As a result of the grain band arrangement, the studs are stronger and will wear better.

As shown in Figure 6, a solid cylindrical metal rod 21 is used as a blank for forming the stud 12 of this invention. As is customary in metal rods, the metal grain bands of the rod 21 extend longitudinally.

As shown in Figure 7, the blank 21 is inserted in the cylindrical well 22 of a female die member 23. The well 22 is bottomed by a knock-out pin 24. The well 22 is not deep enough to accommodate the entire length of the blank 21 and a portion of the blank extends above the die 23 as indicated in dotted lines.

The die 23 has a head forming recess 25 in the top end thereof and a plunger 26 acts on the end portion of the blank extending above the die to upset this end portion into the recess 25 and form the head 13 on the blank. The pin 24 is pushed into the well 22 to discharge the headed blank from the die 23.

As shown in Figure 8, the headed blank from the die 23 has the head 13 thereof mounted on a table 27 of a rotary milling cutter. The cylindrical shank portion 14 of the blank extends vertically upward from the table 27 and locking members 28 carried by the table can engage the head 13 to securely hold the headed blank with its shank 14 extending vertically upward. The table 27 can be rotatable and carry a plurality of headed blanks for successively being brought under an internal mill cutter head 29 rotated by a drive shaft 30 to form a pointed end 31 on the top end of the cylindrical shank 14. The mill cutter 29 has a conical cutting well receiving the top end of the shank 14 to form the conical pointed end 31 thereon.

The machine of Figure 8 can be arranged so that it will operate automatically to successively bring a headed stud under the mill cutter 29 for the pointing operation and to successively discharge the pointed studs out of the machine.

The pointing operation is for the decrease or elimination of flash metal in the subsequent die-pressing operation for flattening the metal to form the wedge-shaped end thereon. Instead of a mill cutter pointing operation, the end of the blank could be shaped by die-pressing into the form of a thick, blunt screw driver. For example, a V shaped punch and die could be used with the punch pushing the end of the stud through the die to shave off the end of the stud into a blunt screw driver form. Enough stock would thereby be removed to prevent subsequent flashing in the subsequent coining die operation.

As shown in Figure 9, a pair of die blocks 32 and 33 is provided to form the wedge-shaped enlarged ends on the pointed and headed studs produced from the blank of Figure 6 by the upsetting dies of Figure 7 and the rotary cutter of Figure 8. The dies 32 and 33 cooperate to provide a circular aperture 34 in which the cylindrical shank portion 14 can extend. A block 35 is provided in spaced relation in front of this aperture 34 to engage the head 13 of the stud and prevent the stud from being extruded out of position between the dies. This block 35 can be carried by the lower die 32.

As shown in Figures 10 and 11, the lower die 32 is in the form of a metal block having a cross-shaped recess 36 in the top face thereof for receiving the cross-shaped raised portion 38 of the top die 33 shown in Figure 12. As shown in Figure 10, the die 32 receives the headed and pointed blank therein and after the die pressing operation, as shown in Figure 11, the pointed end 31 and adjacent cylindrical portion 14 of the blank are pressed into the enlarged wedge-shaped end of the stud.

As best shown in Figure 12, the die 33 has a semi-cylindrical recess 39 cooperating with a similar recess in the lower die 32 to form the circular opening 34 shown in Figure 9. This recess 39 extends horizontally inward from an end face of the die to an inwardly projecting rib 40 which slopes inwardly into the recess 39 from a level above the top of the recess. Behind this rib 40 there is formed an enlarged well 42 with a pointed end 42a for shaping the pointed end and adjacent cylindrical portion of the stud into the enlarged portion of the finished stud. This well 42 slopes upwardly as shown in Figure 13, so that its shaping surface lies at an angle from the horizontal.

The bottom die 32 is complementary shaped and has a similar rib 40.

When the dies are brought together with the blank shown in Figure 10 therebetween the ribs 40 of the dies will press slots in the cylindrical shank 14 of the stud while the pointed end of the stud and adjacent cylindrical portion will be flattened and enlarged to form the shoulders 18—18 immediately behind the ribs 40. During the die pressing operation the pointed end 31 and an adjacent portion of the cylindrical shank 14 is flattened and spread out laterally.

In commercial operation it may be desired to carry out the die pressing procedure in several steps, using first a rough wornout die and then an accurate new die. This will result in a longer die life and a more accurate finished stud.

From the above descriptions it will be understood that the invention now provides a simple, quick and inexpensive method of forming complicated fastener stud shapes from simple cylindrical rod blanks without wasting metal. The method of the invention includes an upsetting operation to form a head on the cylindrical rod, a pointing operation to form a pointed end on the rod, and a die pressing operation to flatten out an enlarged pointed end of the blank as well as an adjacent cylindrical portion of the blank into the form of a wedge-like head having helical side faces extending from sloping end faces for a quarter of a turn to terminate at root ends in inwardly extending shoulders. The end faces converge at an apex. The shoulders are formed simultaneously with the wedge shaping operation. The finished studs of this invention have all surfaces subjected to stress and wear defined only by the sides of metal grain bands, since the initial cylindrical rod blank has the grain bands extending longitudinally or axially along its length. These longitudinally or axially extending bands are only bowed outwardly during the stud forming step and are not cut to expose grain band ends.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The method of making a fastener stud which comprises upsetting a cylindrical metal rod to form an enlarged head on one end thereof, spinning a cutter on the other end of the rod to form a conical pointed end thereon, die pressing the pointed end and an adjacent cylindrical portion of the rod to deform the same into a flat wedge shaped extremity having end surfaces diverging from the point of the conically pointed end and flattened side walls spread laterally beyond the original cylindrical rod dimension to define helical quarter turn grooves, and simultaneously pressing diametrically opposed slots into the cylindrical rod at the root ends of the grooves to provide inwardly extending locking shoulders at said root ends.

2. The method of making a fastener stud which comprises upsetting a cylindrical metal rod to form an enlarged circular head on one end thereof, pointing the other end of the cylindrical rod, flattening the pointed end and adjacent cylindrical portion of the rod into an enlarged flattened recess of helical contour terminating in opposed inwardly projecting ribs to simultaneously form a flattened wedge shaped extremity on the rod with diverging quarter turn helical sides terminating at their root ends in inwardly projecting shoulders.

3. In the method of making a fastener stud, the step which comprises flattening a pointed cylindrical rod into an enlarged flattened recess of helical contour terminating in spaced opposed inwardly projecting ribs, to form a flattened wedge shaped extremity on the rod with opposite quarter turn helical sides and diametrically opposed slots in the rod at the root ends of the helical sides for providing inwardly extending locking shoulders at said root ends.

4. The method of forming fastener studs which comprises seating a cylindrical metal rod into the cylindrical well of a female die having an enlarged head forming recess in the end thereof, pressing one end of the rod into said recess to form an enlarged head on said rod, supporting the headed rod in an upright position with the cylindrical rod portion extending upward, enveloping the end of the cylindrical rod portion with an internal conically recessed cutter, rotating said cutter on the end of the rod portion to form a conical pointed end thereon, inserting the resulting headed and pointed blank between a pair of complementary dies each having semi-cylindrical recesses terminating in spaced opposed inwardly extending ribs and enlarged flattened well portions of inclined helical shape of greater width than the cylindrical rod, forcing said dies together to form a flattened wedge-like extremity on the pointed end of the rod having helically curved side walls, and simultaneously pressing slots into the cylindrical rod at the root ends of said helical side walls to form inwardly extending locking shoulders.

5. The method of forming a fastener stud which comprises heading one end of a cylindrical rod, pointing the other end of the headed rod, and flattening the pointed end of the rod into wedge-like shape while simultaneously pressing diametrically opposed slots into the rod at the base of the wedge-like portion thereof.

MATTHEW P. GRAHAM.